United States Patent
Dabetic

(10) Patent No.: US 11,193,848 B2
(45) Date of Patent: Dec. 7, 2021

(54) SENSOR CABLE FOR CONDUCTIVE AND NON-CONDUCTIVE LIQUIDS

(71) Applicant: ELSA Advanced Systems Pte Ltd, Singapore (SG)

(72) Inventor: Sacha Dabetic, Maurepas (FR)

(73) Assignee: ELSA Advanced Systems Pte Ltd, Singapore (SG)

( * ) Notice: Subject to any disclaimer, the term of this patent is extended or adjusted under 35 U.S.C. 154(b) by 153 days.

(21) Appl. No.: 16/612,865

(22) PCT Filed: May 11, 2018

(86) PCT No.: PCT/IB2018/000593
§ 371 (c)(1),
(2) Date: Nov. 12, 2019

(87) PCT Pub. No.: WO2018/207021
PCT Pub. Date: Nov. 15, 2018

(65) Prior Publication Data
US 2020/0200640 A1    Jun. 25, 2020

(30) Foreign Application Priority Data
May 12, 2017 (FR) .................................. 1770485

(51) Int. Cl.
*G01M 3/16* (2006.01)
*G01M 3/04* (2006.01)

(52) U.S. Cl.
CPC ............ *G01M 3/045* (2013.01); *G01M 3/165* (2013.01)

(58) Field of Classification Search
CPC .............................. G01M 3/045; G01M 3/165
See application file for complete search history.

(56) References Cited

U.S. PATENT DOCUMENTS 2,716,229 A * 8/1955 Wehrmann ............... F28F 1/003
340/605
3,564,526 A * 2/1971 Butts ..................... G01M 3/165
340/524

(Continued)

FOREIGN PATENT DOCUMENTS

DE    3920723 A1 * 1/1991 ............ G01M 3/165
FR    2 773 613 A1    7/1999
(Continued)

OTHER PUBLICATIONS

Jul. 19, 2018 Search Report issued in International Patent Application No. PCT/IB2018/000593.

Primary Examiner — Alexander A Mercado
(74) Attorney, Agent, or Firm — Oliff PLC

(57) ABSTRACT

A sensor cable of conductive and non-conductive liquids leaks for example stored in a tank or flowing in a pipe. The cable is composed of a main body and at least one sensor element made of a central wire surrounded by an insulating sheath, itself integrated in an expandable conductive sheath, the wire and the expandable conductive sheath being arranged to contact conductive and non-conductive fluids, the main body being formed by extruding a plastic material and extruded on a central support in the form of either a plastic rod or a metal rod coated with plastic. This can be applied to liquid leakage watch systems.

12 Claims, 4 Drawing Sheets

(56) References Cited

U.S. PATENT DOCUMENTS

Figure 1:
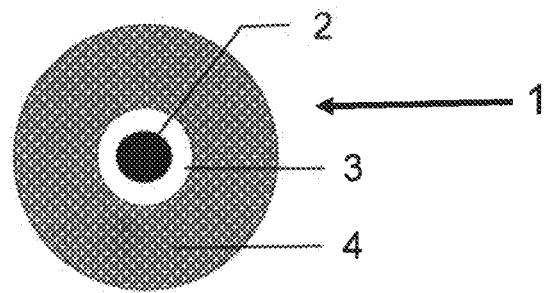

| | | | | | |
|---|---|---|---|---|---|
| 3,981,181 | A | * | 9/1976 | Ochiai | G01M 3/045 73/40.5 R |
| 4,029,889 | A | * | 6/1977 | Mizuochi | G01M 3/045 174/11 R |
| 4,361,799 | A | * | 11/1982 | Lutz | G01K 3/00 219/505 |
| 4,487,057 | A | * | 12/1984 | Lutz | G01K 3/00 174/11 R |
| 4,594,638 | A | * | 6/1986 | Suzuki | G01M 3/165 174/11 R |
| 4,862,146 | A | * | 8/1989 | McCoy | G01M 3/04 340/605 |
| 4,918,977 | A | * | 4/1990 | Takahashi | G01M 3/045 174/11 R |
| 4,926,129 | A | * | 5/1990 | Wasley | G01M 3/045 174/11 R |
| 4,926,165 | A | * | 5/1990 | Lahlouh | G01M 3/045 340/603 |
| 4,972,179 | A | * | 11/1990 | Akiba | F17D 5/06 174/11 R |
| 5,017,908 | A | * | 5/1991 | Macpherson | G01M 3/045 174/11 R |
| 5,101,657 | A | * | 4/1992 | Lahlouh | G01M 3/165 340/604 |
| 5,313,823 | A | * | 5/1994 | Berkman | G01M 3/165 174/11 R |
| 5,341,128 | A | * | 8/1994 | Keyser | G01M 3/045 174/11 R |
| 5,381,097 | A | * | 1/1995 | Takatori | G01M 3/045 174/47 |
| 5,410,255 | A | * | 4/1995 | Bailey | G01M 3/165 174/11 R |
| 9,513,185 | B2 | * | 12/2016 | Gautier | G01M 3/045 |
| 2004/0098212 | A1 | * | 5/2004 | Hong | G01M 3/165 702/51 |
| 2009/0301172 | A1 | * | 12/2009 | Raymond | H01B 7/322 73/40 |
| 2012/0098555 | A1 | * | 4/2012 | Raymond | G01M 3/045 324/694 |
| 2016/0290887 | A1 | * | 10/2016 | Gautier | G01M 3/18 |
| 2020/0200640 | A1 | * | 6/2020 | Dabetic | G01M 3/045 |

FOREIGN PATENT DOCUMENTS

| | | | | |
|---|---|---|---|---|
| FR | 2773613 A1 | * | 7/1999 | ............ G01M 3/045 |
| WO | WO-2006086178 A1 | * | 8/2006 | ............ G01M 3/165 |
| WO | 2015/067615 A1 | | 5/2015 | |

\* cited by examiner

SENSOR CABLE FOR CONDUCTIVE AND NON-CONDUCTIVE LIQUIDS

The technical domain of the present invention is the detection of liquid leaks, conductive and non-conductive, especially in the field of transport and storage of hydrocarbons.

It is well known that the pipes and storage tanks are likely to experience leaks difficult to locate when these structures are buried. Hydrocarbons are toxic products that pose a risk to the environment and human health. It is therefore particularly important to be able to detect a leak and to be able to locate it.

In the prior art there are numerous methods for detecting the presence of hydrocarbons in the air, soil, water or on the surface of the water or the soil, among which electronic noses, visual indicators consisting of reactive components, optical sensors, sensors of an absorption point, sensor cables and more.

Sensor cables have the advantage of allowing continuous monitoring of pipes and tanks along their entire length and circumference.

In the field of sensor cables, the prior art describes different embodiments of non-conductive liquid leak detection systems.

The U.S. Pat. No. 5,101,657 discloses a sensor cable comprising an expandable conductive or semiconductor element which, when in contact with a non-conductive liquid, expands mechanically bringing two separate conductors into electrical contact.

The U.S. Pat. No. 5,410,255 discloses a detection method for distinguishing conductive liquid leaks from non-conductive liquid leaks, but this method does not detect the degree of immersion of the sensor cable in a conductive liquid. It also describes the use of the absorption of a hydrocarbon by a suitable environment, which modifies the electrical properties of this environment, a modification detected by the linked monitoring system.

The patents WO2015067615 and U.S. Pat. No. 5,341,128 disclose a conductive or semiconductor sensor element that partially or completely loses its conductance when it comes into contact with a non-conductive liquid.

These technologies are suitable for use on outdoor installations and can be used to monitor pipelines and transport tanks.

However, if the sensor cables in question are immersed in a conductive liquid, for example water, they will not be able to detect non-conductive liquids, for example hydrocarbons, which will float on the surface. Moreover, none of these cables for detecting non-conductive liquids can detect immersion in water. The user can therefore remain a very long time without knowing that the monitoring system is neutralized by immersion in water.

The aim of the present invention is therefore to provide a sensor cable which makes it possible to detect both leaks of non-conductive liquids, such as hydrocarbons, and conductive liquids, such as water, bases or acids. The invention also relates to an electronic device used with this sensor cable.

The subject of the invention is therefore a cable for detecting leaks of conductive and non-conductive liquids for example stored in a tank or flowing in a pipe, composed of a main body and at least one sensor element constituted by a central metal wire surrounded by an insulating sheath, itself integrated in an expandable conductive sheath, the central metal wire and the expandable conductive sheath being arranged to come into contact with the conductive and non-conductive fluids.

According to a characteristic of the invention, the main body is made by extrusion of a plastic material.

According to another characteristic of the invention, the main body is extruded on a central support in the form of either a plastic rod or a metal rod coated with plastic.

According to another characteristic of the invention, the liquid leak sensor cable in which the sensor element is wound spirally around the main body.

According to another characteristic of the invention, the sensor element consists of a central wire covered with an insulating sheath itself covered with an expandable conductive sheath.

According to another characteristic of the invention, the said expandable conductive sheath is made of a conductive polymer material.

According to another characteristic of the invention, the said expandable conductive sheath of the sensor element is partially covered with an insulating sheath, the assembly having in section a circular or oval shape.

According to another characteristic of the invention, the said insulating sheath is made of polymeric material.

According to another characteristic of the invention, the expandable conductive sheath and the insulating partial sheath are manufactured using a silicone material.

According to another characteristic of the invention, the sensor element partially covered with the insulating sheath is inert in the face of metal dust deposits.

The invention also relates to a sensor cable inserted into an electrically insulating perforated braided sheath.

The invention further relates to a liquid leak detection system, comprising the sensor cable as described above connected to a watch and alarm system.

A first advantage of the invention lies in the simultaneous detection of conductive and non-conductive fluids using a compact structure.

An advantage of the invention lies in the use of silicone as an expandable conductive sheath. Indeed, it is an easy to work material and which also has a property of percolation of non-conductive liquids that impregnate. This property prevents the expansion of the sheath before it is impregnated with a substantial amount of hydrocarbons.

Another advantage of the detector according to the invention is that the expandable sheath is conductive. Indeed, this effectively monitors the ability of the detector to detect the presence of non-conductive liquids.

Another advantage of the detector according to the invention is the presence of a partial insulating sheath around the sensor element or the sensor cable itself, which prevents the sensor element from coming into contact with conductive parts present in the environment (metal braids, pipes, dust, etc. . . . ) which would cause a false alarm.

Another advantage of the detector according to the invention lies in the fact of using silicone containing electrically conductive particles, such as carbon for example, for the expandable conductive sheath and colored silicone for the insulating partial sheath. Thus, the two layers of material adhere perfectly to one another and create a unitary assembly.

Another advantage of the invention lies in the fact that the same sensor element performs the functions of detection of conductive fluids and non-conductive fluids to greatly simplify the manufacture of the sensor cable.

Another advantage of the invention is to use an oval section sensor element. The oval shape ensures, during the winding of the sensor element around the main body, that the partial insulating sheath, which is the flattened portion, takes place against the main body and thus adopts an optimal spatial arrangement.

Another advantage of the invention lies in the use of silicone material of different colors for the conductive sheath and the insulating sheath, which makes it possible to locate and identify them visually in a simple and rapid manner.

Figure 2:
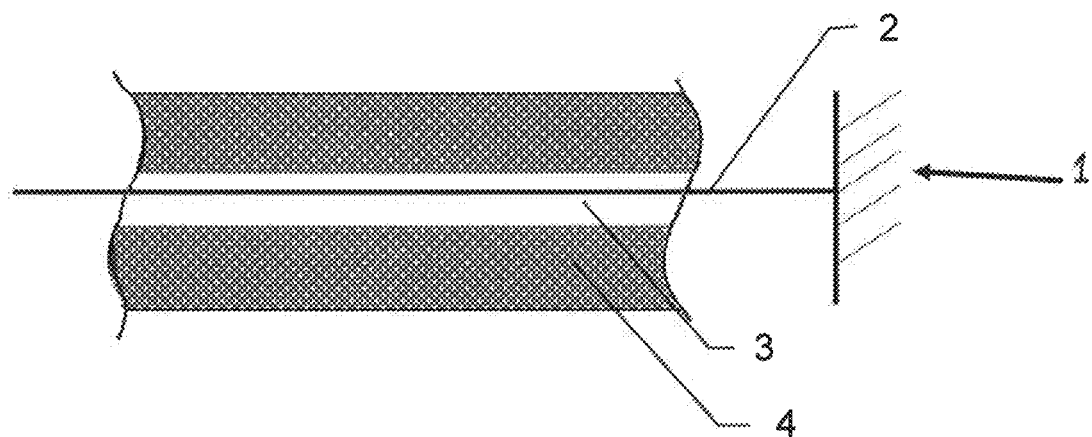
Figure 3:
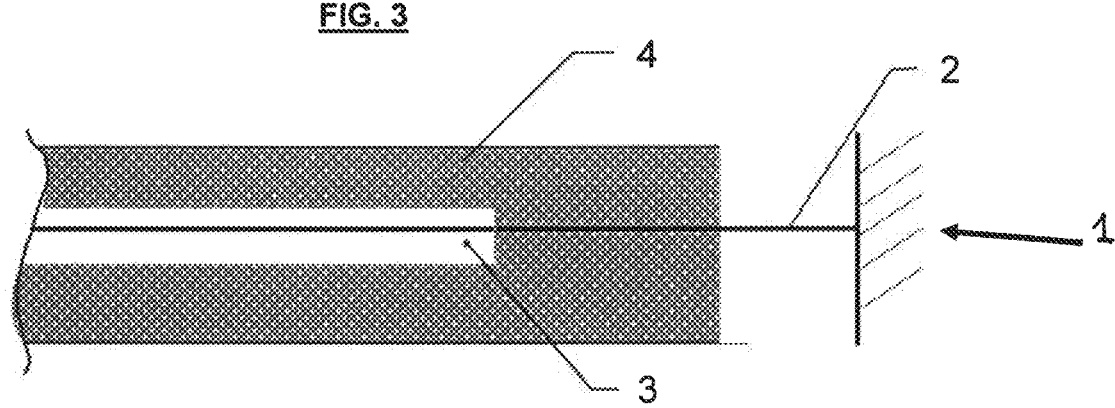
Figure 4:
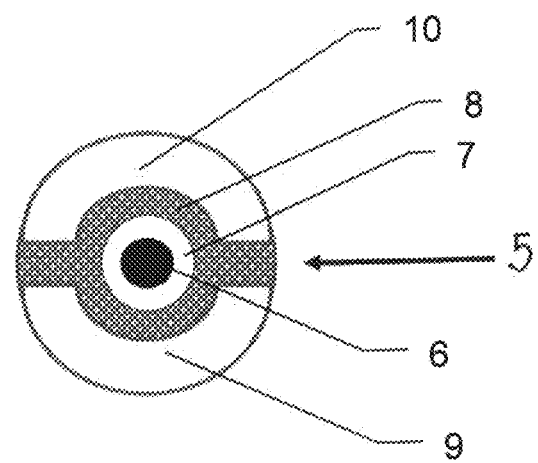
Figure 5:
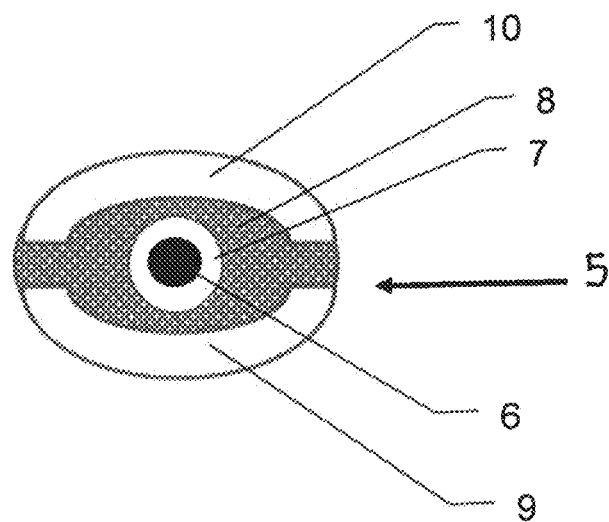
Figure 6:
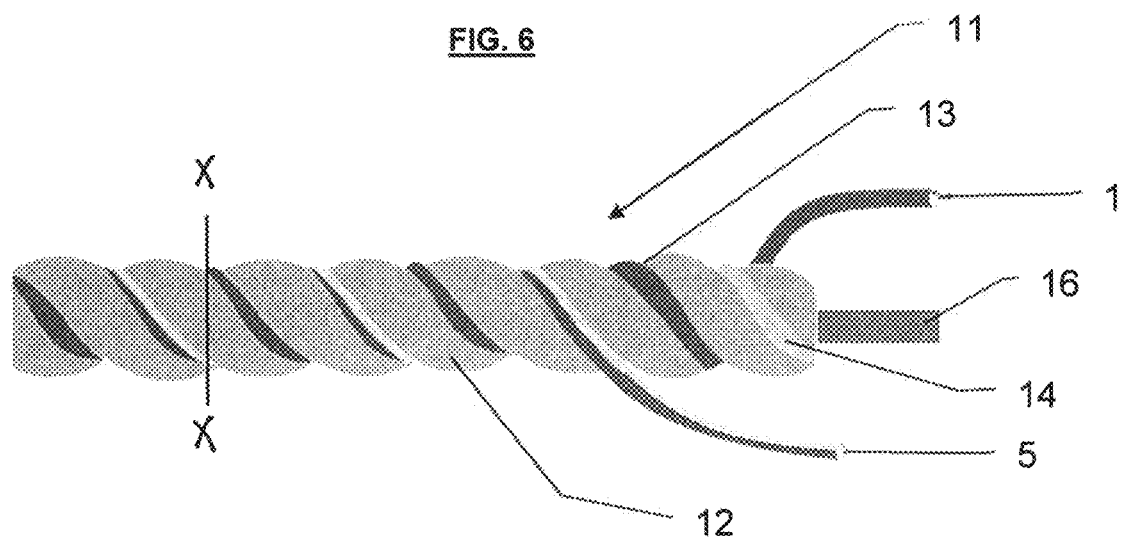
Figure 7:
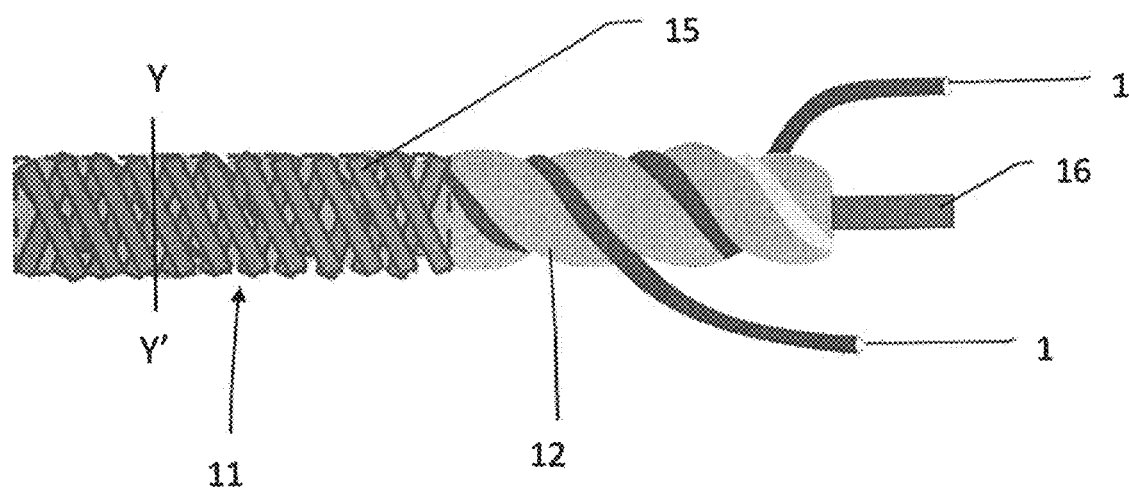
Figure 8:
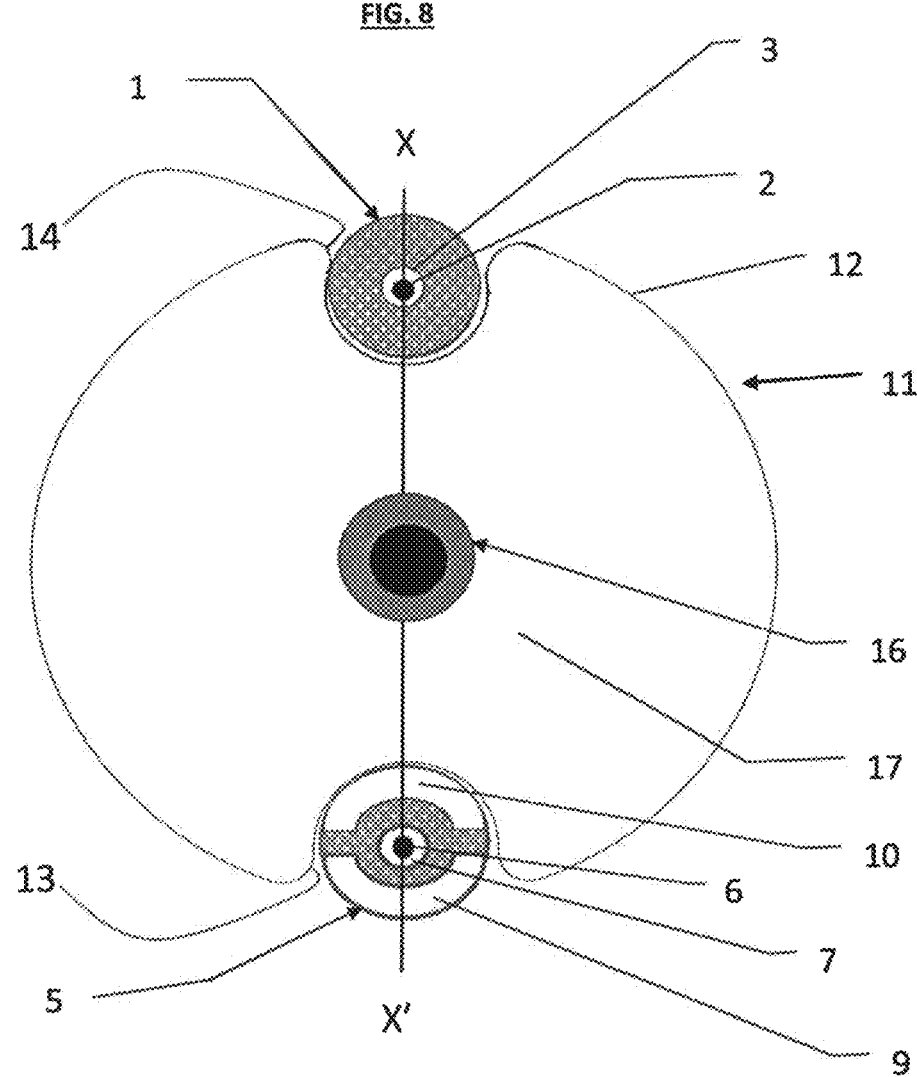
Figure 9:
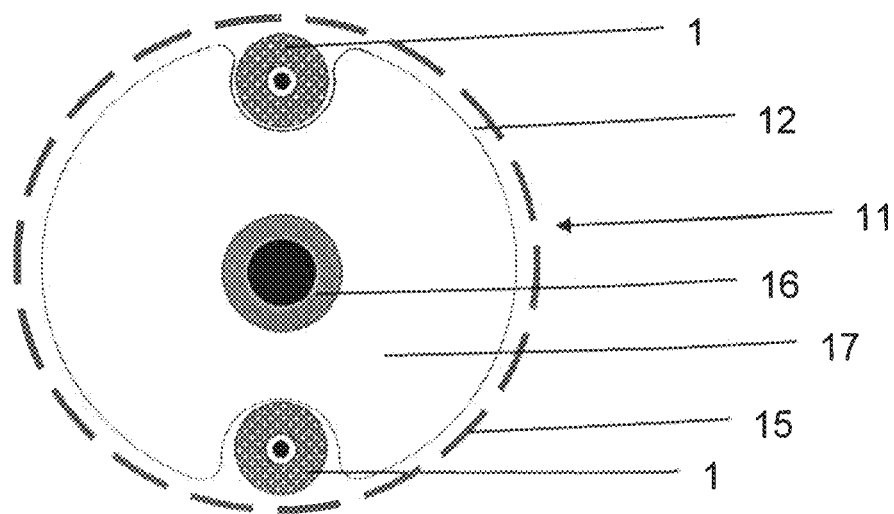
Figure 10:
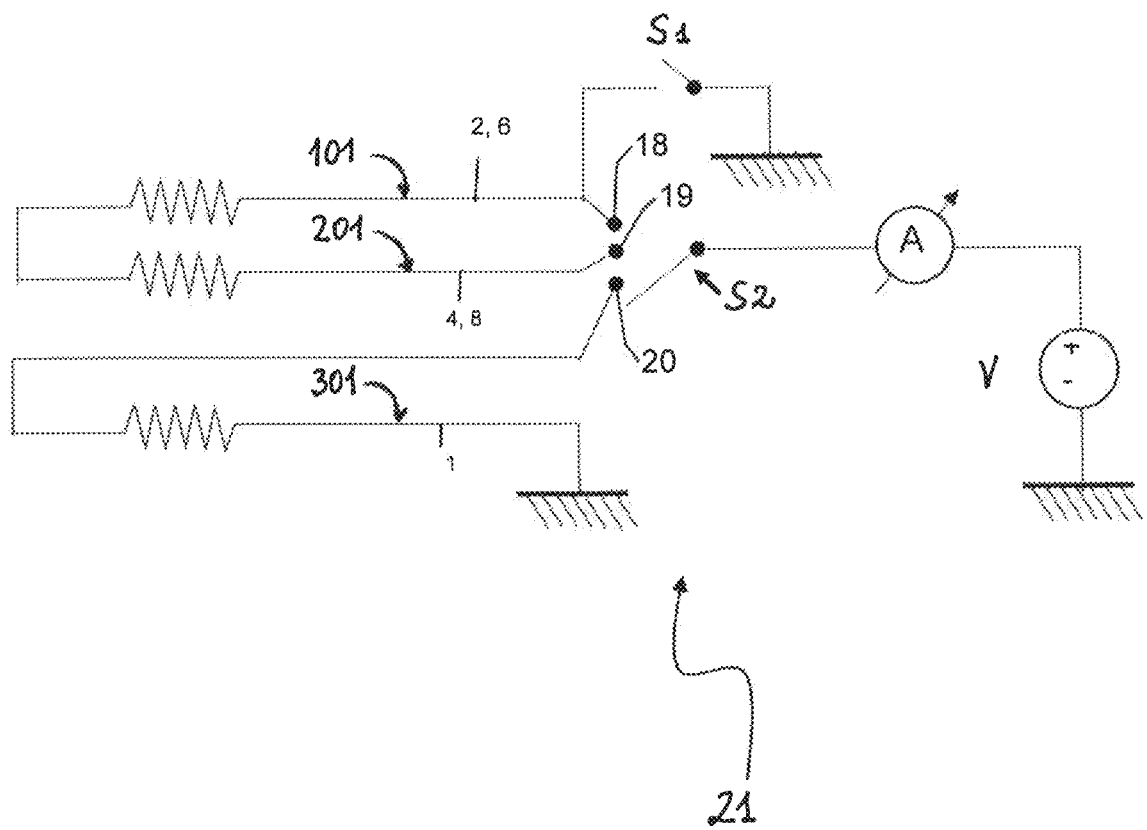

Other features, details and advantages of the invention will be better understood on reading the additional description which will follow of embodiments given by way of example in relation to drawings in which:

FIG. 1 is a cross-section of a fluid sensor element,

FIG. 2 is a view in longitudinal section of the sensor element of FIG. 1, FIG. 3 is another view in longitudinal section of the end of the sensor element of FIG. 1, FIG. 4 is a cross-section of a second embodiment of a fluid sensor element of round section, FIG. 5 is a cross-section of an oval section fluid sensor element, FIG. 6 is a side view of a sensor cable, FIG. 7 is a side view of a sensor cable provided with a perforated braided sheath, FIG. 8 is a cross section of the sensor cable according to XX of FIG. 6, FIG. 9 is a cross section of the sensor cable according to YY of FIG. 7, and FIG. 10 is a diagram of the electrical circuit incorporating the sensor cable connected to a watch and alarm system.

FIG. 1 shows a cross section of a fluid sensor element 1. It consists of a central wire 2 covered with an insulating sheath 3, wrapped with an expandable conductive sheath 4.

The sensor element 1 is connected to an electrical system. An electric current flows continuously through the central wire 2.

When this sensor element 1 comes into contact with a conductive liquid, the sheath 4 being conductive does not prevent contact between the conductive liquid and the central wire 2. In this embodiment, the sheath 3 is there essentially to provide mechanical protection and this against corrosion, and to avoid contact of the central wire 2 with surfaces or conductive parts (plates, braids, dust . . . ) which would be present around the sensor element 1.

When the sensor element 1 comes into contact with a non-conductive fluid, the expandable conductive sheath 4 impregnates with this liquid and swells.

The expandable conductive sheath 4 is made of a naturally insulating silicone material containing conductive particles. This composition gives it a known conductivity, and therefore a known resistance. When the expandable conductive sheath 4 undergoes this expansion, its conductivity decreases and its resistance increases.

FIG. 2 is a longitudinal section of the fluid sensor element 1. The central wire 2 is grounded at one end. It is wrapped in the insulating sheath 3. Around this insulating sheath is deposited the expandable conductive sheath 4.

FIG. 3 is a longitudinal section of the fluid sensor element 1 at its end. In this embodiment, the central wire 2 is free of insulating sheath 3 over a certain length. It is thus in direct contact with the expandable conductive sheath 4.

This characteristic makes it possible to close the electric circuit formed by the sensor element 1 when it is connected to the electronic system described hereinafter with reference to FIG. 10. Thus, the electric current can circulate continuously.

The expandable conductive sheath 4 having a known conductivity, an increase in the resistance to current flow indicates swelling of said expandable conductive sheath 4. This swelling is caused by a contact with a non-conductive liquid. The drop in resistance indicates that the current is flowing through an additional path, i.e. the detector is in contact with a conductive liquid.

FIG. 4 shows a cross section of a round section fluid sensor element 5. It consists of a metallic central wire 6, wrapped with an insulating sheath 7, itself surrounded by a conductive expandable sheath 8, which is in turn covered with a partial insulating sheath, consisting of a lower part 9 and an upper part 10.

The detection of conductive and non-conductive liquids proceeds in the same manner as for the sensor element 1 of FIG. 1. The two-part partial insulating sheath 9, 10 is made of colored silicone material.

FIG. 5 shows a cross-section of an oval section fluid sensor element 5. It is constituted identically to the sensor element of FIG. 4 by having an oval outer shape. The oval section of the sensor element 5 has the advantage of being able to easily position the sensor element 5 around the main body of the sensor cable (see FIG. 6). Indeed, the sensor element 5 cannot pivot in its groove, unlike the embodiment illustrated in FIG. 4 of a sensor element 5.

The sensor element may adopt a round, square, elliptical, rectangular or any other shape in order to optimize the process of manufacturing the sensor cable. For example, if a strip deposition of the partial insulating sheath is made, a sensor element having a square or rectangular section may be preferred in order to facilitate manufacture.

In the embodiment where the sensor element comprises a partial insulating sheath, the orientation of said element becomes an important characteristic. Indeed, the sensor element is oriented such that the two zones where the partial insulating sheath flushes on the surface are, respectively, in contact with the main body of the sensor cable and the external mean, the two zones where the expandable conductive sheath flushes on the surface then being oriented towards the side walls of the grooves. Thus, the conductive surface is not in contact with the environment, which prevents false alerts in case of contact with a conductive object (spade, plate, nail, etc. . . . ).

This desired orientation can be obtained by manual or mechanical winding and controlled by visual verification, thanks to the different color of the two sheaths.

FIG. 6 shows a side view of the liquid leak sensor cable 11. In this embodiment, the sensor cable 11 is provided with a fluid sensor element 1 and a fluid sensor element 5. The two sensor elements 1 and 5 are wound around a main body 12. Each sensor element is housed in a respective groove 13, 14 whose width is greater than the diameter of the respective element 1, 5.

The two sensor elements 1 and 5 are spirally wound around the main body 12 in diametrically opposed positions.

As previously explained, the central wire 2, 6 of each sensor element 1, 5 is stripped at the end of the sensor cable 11 and brought into contact with its respective expandable conductive sheath 4, 8 in order to create an electrical closed circuit and allow the flow of electric current.

The sensor cable 11 is suitably disposed under the installation to be monitored: storage tank, conduct, pipe, tank or other storage or transport facility for conductive or non-conductive liquids. Thus, in case of leakage of the said installation, it will be in contact with the spilled liquids. It is connected to a watch and alarm system that puts it permanently on. Leaks are detected by changes in the flow of electric current, as shown in FIGS. 1 and 2.

FIG. 7 shows a side view of a liquid leak sensor cable 11. In this particular embodiment, the sensor cable 11 is inserted into a perforated braided sheath 15 and is provided with two fluid sensor elements 1.

In this embodiment, the perforated braided sheath 15 is made of an insulating plastic material, for example a silicone material, and can replace the partial insulating sheath 9, 10 of the fluid sensor element 5. It is then possible to use two fluid sensor elements 1, which are associated with the perforated braided sheath 15.

FIG. 8 is a cross-section of the liquid leak sensor cable 11 of FIG. 6 along the X-X' axis. The sensor cable 11 consists of a main body 12, itself composed of a central extrusion support 16 and an extruded body 17. This main body is provided with a fluid sensor element 1 and a fluid sensor element 5, wound around it in a spiral, so as to be always diametrically opposed to each other. The partial insulating sheath 9, 10 of the fluid sensor element 5 is positioned so that one part 9 is placed in contact with the main body 12, and the other part 10, diametrically opposed, or facing the outside mean.

The central extrusion support 16 may be a plastic sheathed metal rod, which is the embodiment shown in this figure, a plastic cylinder or other component capable of supporting the extrusion of the extruded body 17.

The extruded body 17 is made by extruding a plastic material, for example silicone, onto the central extrusion support 16. When this plastic is still malleable, the grooves 13, 14 are formed to accommodate the sensor elements 1, 5, or by wrapping around the main body 12 a fiber or wire of a larger diameter to those of the sensor elements 1, 5, or by winding the sensor elements 1, 5 themselves, associated with one or more other wires, in order to form wider grooves 13, 14 than the wires sensors 1, 5.

The grooves can also be created by mechanical removal, laser cutting, or any other suitable known method.

Thus, in contact with the non-conductive liquids, the expandable conductive sheaths 4, 8 undergo a volume expansion which requires an upper space. Alternatively, the grooves 13, 14 may alternatively be made by mechanical removal of the material making up the main body 12, by laser cutting, or any other method known to a person skilled in the art.

The groove 13, 14 should preferably be between 5% and 200% larger than the diameter of the sensor wire 1, 5.

FIG. 9 is a cross section of the sensor cable 11 of FIG. 7, along the Y-Y' axis. The sensor cable 11 is here wrapped in a perforated braided sheath 15. The cable 11 is composed of a main body 12 and two fluid sensor elements 1, 1.

The sensor cable 11 is obtained according to the method described above.

The perforated braided sheath 15 is manufactured in isolation by extrusion, and the sensor cable 11 is then inserted inside.

The partial insulating sheath may be deposited on the expandable conductive sheath in a strip coating construction, a double layer extrusion, a second dip coating, a second monolayer extrusion, or any other suitable method well known to a person skilled in the art.

It is however necessary that the partial insulating sheath be securely attached to the expandable conductive sheath. This will be ensured by a method such as the coextrusion of the two sheaths, the extrusion of two layers of compatible materials, the deposition of a bonding material, or any other appropriate known method.

The partial insulating sheath can be replaced by a perforated braided sheath surrounding the sensor cable over its entire length. The perforated braided sheath is made by extrusion of a plastic material and the sensor cable is slid inside thereafter.

This perforated braided sheath then plays the same role of protecting the sensor elements against contact with conductive objects of the environment, which would produce false alarms.

FIG. 10 represents the electrical diagram of a watch and alarm system 21 connected to the sensor cable according to the invention. The system 21 is permanently energized. The designated circuit 101 represents the central wire 2, 6 of the fluid sensor element 1, 5. The designated circuit 201 represents the expandable conductive sheath 4, 8 of the sensor element 1, 5. At the end of the cable 11, the central wire 2, 6 is stripped and is brought into contact with the expandable conductive sheath 4, 8 to close the electrical circuit. The circuit 301 represents a second optional sensor wire such as the sensor element 1 shown in FIG. 8. Alternatively, the elements 101, 201 and 301 may be of identical structure. S1 and S2 are switches. V is a voltage source connected to the circuit A is an ammeter connected to the circuit.

The switch S1 can take two positions, open or closed.

The switch S2 can adopt three positions: high 18, median 19 and low 20.

When the switch S1 is open, the central wire 2, 6 is not grounded.

If the switch S2 is in the high position 18 or median 19, the ammeter A measures the current flowing between the parts 201 and 301.

If the switch S2 is in the low position 20, then the ammeter A measures the current flowing in the part 301, which means that this configuration makes it possible to check the integrity of this part of the system.

When the switch S1 is closed, the central wire 2, 6 is grounded. This position is used only when S2 is in the median position 19, and the ammeter A then measures the current flowing in the circuits 201 and 101, which makes it possible to determine the nominal resistance Rn of the assembly. It is then possible to define an alert threshold corresponding to a fraction of Rn, determined according to the needs of the user.

When the measured resistance R is greater than the nominal resistance Rn of the element 201, this means that the sensor cable 11 is in contact with a non-conductive liquid following the swelling of the sheath 4, 8. When R is less than Rn, this means that the sensor cable 11 is in contact with a conductive liquid.

In the high position 18, the ammeter A measures a first voltage i1 and in the median position 19, a second voltage i2. The comparison of these two voltages makes it possible to determine the position of the contact between the detector and the conductive liquid.

If i1 is greater than i2, then the point of contact is closer to the distal end of the cable than S2. If i2 is greater than i1, then the point of contact is closer to the proximal end of the cable than S2. If both voltages are equal, the point of contact is approximately in the middle of the sensor cable.

An alternative use of this system 21 does not use the high position 18 of S2. The low position 20 then makes it possible to determine the integrity of the element 301. The median position 19 makes it possible to determine the resistance of the element 201. When this resistance R is greater than the nominal resistance Rn of the element 201, this means that the sensor cable 11 is in contact with a non-conductive liquid following swelling of the sheath 4, 8. When R is less than Rn, this means that the sensor cable 11 is in contact with a conductive liquid.

It can be seen that the elongated cable type detector according to the invention is capable of detecting both the presence of conducting liquids such as water, bases or acids and the presence of non-conductive liquids such as hydrocarbons.

It is the central metal wire 2, 6 which ensures the detection of conductive liquids and the expandable conductive sheath 4, 8 that of non-conductive liquids. The said expandable conductive expandable sheath 4, 8 further provides mechanical protection and this against corrosion of said central wire 2, 6.

The expandable conductive sheath 4, 8 may be made of different materials well known for their suitable properties: natural or synthetic rubbers, silicone elastomers, celluloid, styrenic polymers or others.

The invention claimed is:

1. A sensor cable for conductive and non-conductive liquid leaks, the sensor cable comprising:
   a main body; and
   at least one first sensor element formed of at least (i) a central wire surrounded by a first insulating sheath, (ii) a first expandable conductive sheath surrounding the first insulating sheath, and (iii) a pair of partial second insulating sheath halves separately positioned on opposite sides of an axis of the central wire around the first expandable conductive sheath, the central wire and the first expandable conductive sheath being arranged to contact conductive and non-conductive fluids.

2. The sensor cable according to claim 1, wherein the main body is made by extruding a plastic material.

3. The sensor cable according to claim 1, wherein the main body is extruded on a central support, which is one of a plastic rod or a metal rod coated with plastic material.

4. The sensor cable according to claim 1, wherein the first sensor element is spirally wound around the main body.

5. The sensor cable according to claim 1, further comprising a second sensor element formed of at least a second central wire covered by a third insulating sheath, which is covered with a second expandable conductive sheath.

6. The sensor cable according to claim 5, wherein the second expandable conductive sheath is made of a conductive polymer material.

7. The sensor cable according to claim 1, wherein the at least one first sensor element has a circular or an oval shaped cross-section.

8. The sensor cable according to claim 7, wherein the pair of partial second insulating sheath halves are made of polymeric material.

9. The sensor cable according to claim 7, wherein the second expandable conductive sheath and the pair of partial second insulating sheath halves are made of silicone material.

10. The sensor cable according to claim 1, wherein the first sensor element is inert against metal dust deposits.

11. The sensor cable according to claim 1, further comprising an electrically insulating perforated braided sheath surrounding the main body and the first sensor element.

12. A liquid leak detection system connected to an alarm circuit comprising the sensor cable according to claim 1.

* * * * *